(12) United States Patent
de Jonge et al.

(10) Patent No.: US 8,489,500 B2
(45) Date of Patent: Jul. 16, 2013

(54) METHOD AND SYSTEM FOR COMPLIANCE HOSTING

(75) Inventors: Peter M. de Jonge, Bountiful, UT (US); Tom Bushell, Salt Lake City, UT (US); Rich Bushell, Layton, UT (US); Lloyd Rutherford, Copperton, UT (US)

(73) Assignee: Peter M. de Jonge, Sandy, UT (US)

( * ) Notice: Subject to any disclaimer, the term of this patent is extended or adjusted under 35 U.S.C. 154(b) by 569 days.

(21) Appl. No.: 12/732,926

(22) Filed: Mar. 26, 2010

(65) Prior Publication Data

US 2011/0238548 A1    Sep. 29, 2011

(51) Int. Cl.
*G06Q 40/00* (2012.01)

(52) U.S. Cl.
USPC .............................. 705/38; 705/35

(58) Field of Classification Search
USPC ...................... 705/35, 38; 707/100
See application file for complete search history.

(56) References Cited

U.S. PATENT DOCUMENTS

| | | |
|---|---|---|
| 5,193,056 A | 3/1993 | Boes |
| 6,904,412 B1 * | 6/2005 | Broadbent et al. ............... 705/38 |
| 2003/0229581 A1 * | 12/2003 | Green et al. ..................... 705/38 |
| 2006/0173759 A1 * | 8/2006 | Green et al. ..................... 705/35 |
| 2006/0253474 A1 * | 11/2006 | Hotchkiss et al. ............ 707/100 |

* cited by examiner

*Primary Examiner* — Samica L Norman
(74) *Attorney, Agent, or Firm* — Thorpe North & Western LLP

(57) ABSTRACT

A method and system is provided for monitoring mortgagee regulatory compliance using a centralized repository. A centralized repository hosts loan origination software (LOS). The centralized repository can be accessible to a compliance monitor and a mortgagee. The mortgagee records borrower loan information into the centralized repository using the LOS. The compliance monitor retrieves borrower loan information using the LOS. The compliance monitor audits borrower loan information for regulatory compliance. The compliance monitor reports audit results to the mortgagee.

20 Claims, 3 Drawing Sheets

METHOD AND SYSTEM FOR COMPLIANCE HOSTING

FIELD OF THE INVENTION

The present invention relates generally to hosting and evaluating the compliance information of mortgagees and mortgage brokers.

BACKGROUND

Home mortgage brokers and home mortgage lenders, also called mortgagee, are instructed to follow government laws and regulation related to their business of providing loans and mortgages to borrowers, called mortgagors. The process of following laws and regulations is called compliance. Based on the Mortgagee Approval Handbook (Directive Number 4060.1 REV-2 dated Aug. 14, 2006) provided by the U.S. Department of Housing and Urban Development (HUD), a mortgagee is instructed in chapter 7, section 7-3, to have quality control plan administered by personnel independent of the loan originators and servicers. The quality control plan may be performed in-house or an outside firm.

SUMMARY

A method and system is provided for monitoring mortgagee regulatory compliance using a centralized repository. A centralized repository hosts loan origination software (LOS). The centralized repository can be accessible to a compliance monitor and a mortgagee. The mortgagee records borrower loan information into the centralized repository using the LOS. The compliance monitor retrieves borrower loan information using the LOS. The compliance monitor audits borrower loan information for regulatory compliance. The compliance monitor reports audit results to the mortgagee.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings in which:

Figure 1:
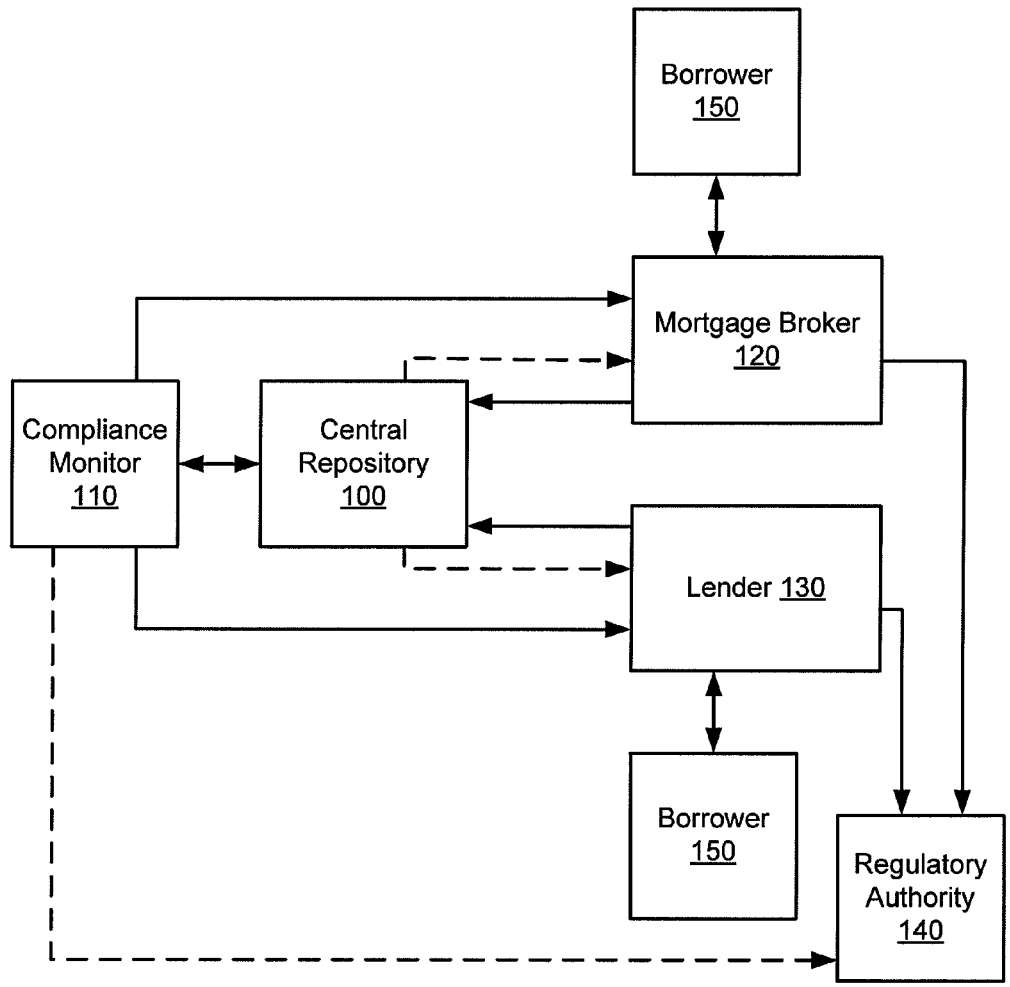
FIG. 1 illustrates a conceptual view of a method for monitoring mortgagee regulatory compliance using a centralized repository in accordance with an embodiment of the present invention.

Reference will now be made to the exemplary embodiments illustrated, and specific language will be used herein to describe the same. It will nevertheless be understood that no limitation of the scope of the invention is thereby intended. The same reference numerals in different drawings represent the same element, and thus their descriptions will not be repeated.

DETAILED DESCRIPTION

Figure 2:
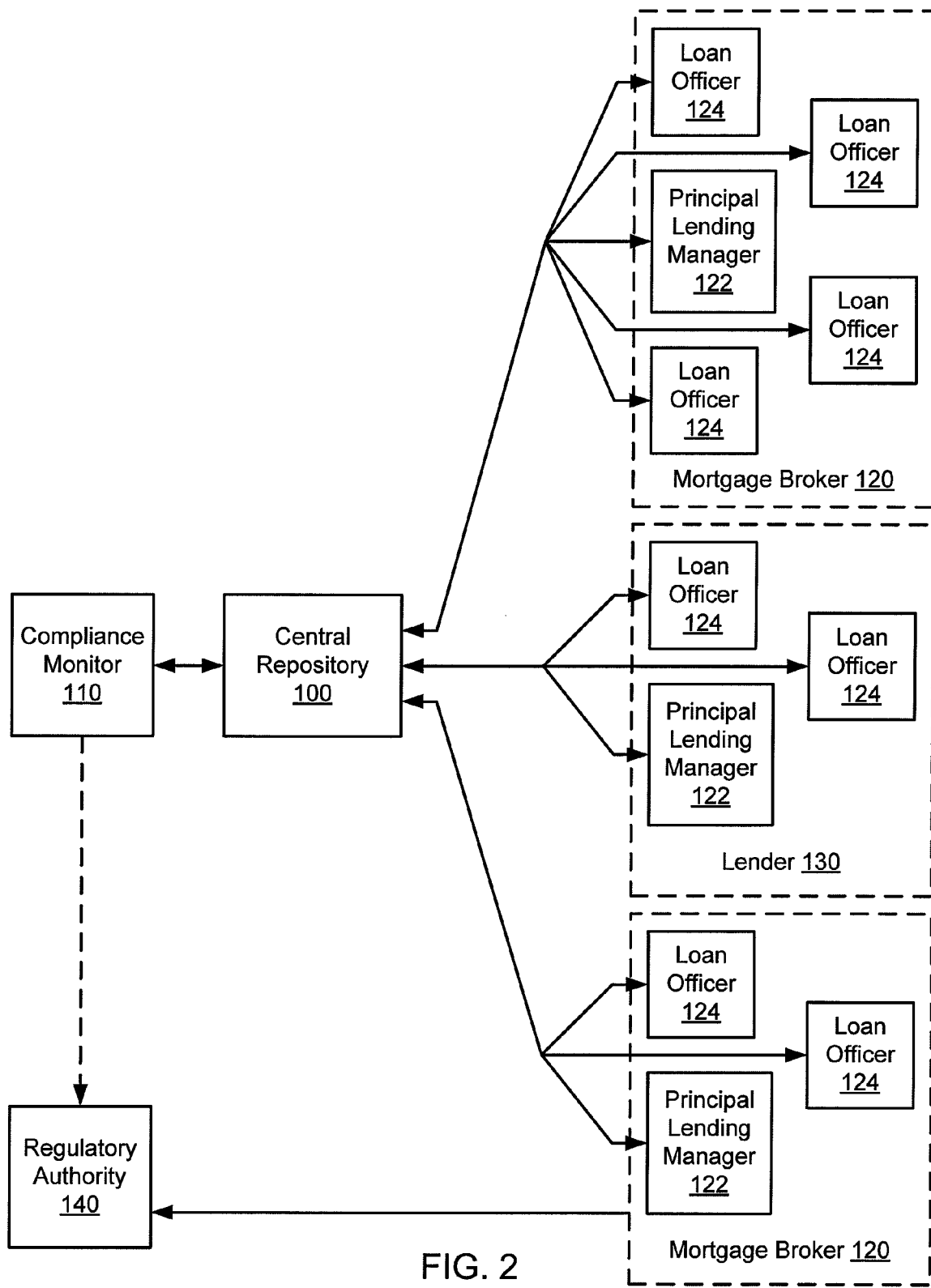
FIG. 2 illustrates a conceptual view of a method for monitoring mortgagee regulatory compliance using a centralized repository in accordance with an embodiment of the present invention.
Figure 3:
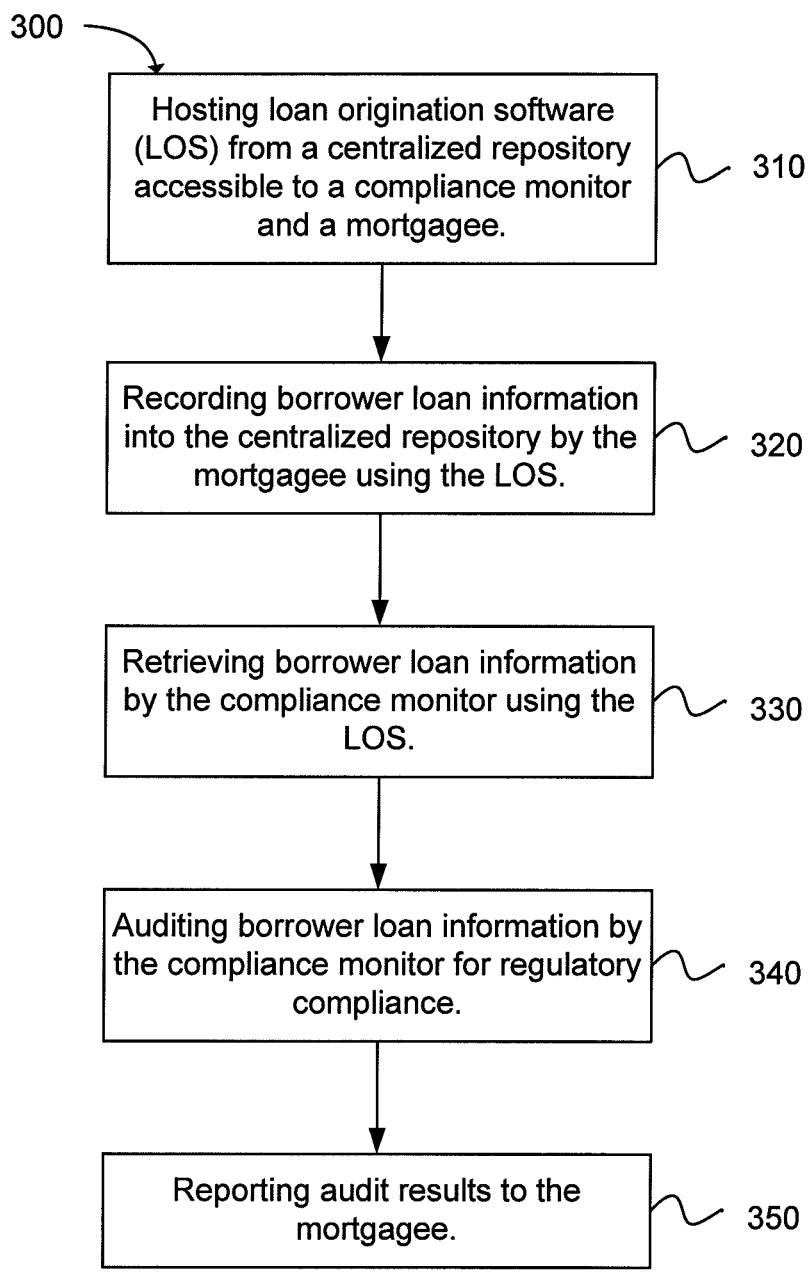
FIG. 3 is a flowchart illustrating a method monitoring mortgagee regulatory compliance using a centralized repository in accordance with an embodiment.

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art practice the invention, it should be understood that other embodiments may be realized and that various changes to the invention may be made without departing from the spirit and scope of the present invention. Thus, the following more detailed description of the embodiments of the present invention, as represented in FIGS. 1 through 3, is not intended to limit the scope of the invention, as claimed, but is presented for purposes of illustration only and not limited to describe the features and characteristics of the present invention, to set forth the best mode of operation of the invention, and to sufficiently enable one skilled in the art to practice the invention. Accordingly, the scope of the present invention is to be defined solely by the claims.

A mortgagee providing residential mortgages or home loans are commonly referred to as home mortgage brokers or home mortgage lenders. The mortgagee can act as an agent for the lender or can be the lender providing temporary loans or permanent loans for the borrower. Mortgagee can be a mortgage broker, a loan originator, a loan producer, a loan servicer, or a lender. Mortgagees can employ or contract with individual loan officers that interact with the borrowers and customers of their loan products during the loan application process. Loan officers can take a borrower's application, collects documentation relative to the loan, interfaces with an underwriter to facilitate loan approval, and work with a borrower to get the borrower a loan or mortgage. A mortgage can be loan that is secured by property such as real property including a home. An underwriter can be an individual or group that assesses the eligibility of a borrower to receive a loan and approves loans for a lender. A loan originator can be any person involved in finding borrowers and helping a borrower get and close a loan. A loan processor can be anyone that collects borrower documents and verifies the information against pre-established guidelines. A servicer can be any person involved in collecting money from a borrower to repay the loan, assessing fees, paying the lender with collected money, and paying taxes and insurance after the loan closes. A servicer can handle and perform escrow services and functions. A loan may be originated or serviced using a loan broker, mortgage broker, or lender. A loan broker or mortgage broker can be an intermediary that finds lenders for borrowers and finds borrowers for lenders. The broker or agent for the lender may provide the documentation requested by a lender and used to execute a loan transaction. Many of the documents may be standard documents used in the lending industry or provide compliance with regulatory requirements.

Regulations can be imposed on mortgagees, including both lenders and brokers, to protect borrowers from aggressive advertising and mortgagee's erroneous statements and non-disclosures. Many of the forms and contractual provisions may be difficult for the typical borrower to understand and the mortgagees may be more familiar with the forms and contractual provisions because of their regular use than the average mortgagor or borrower. The U.S. Department of Housing and Urban Development (HUD) provides and promulgates loan forms and regulates some aspects of the loan origination process. Some of the regulatory compliance provisions for mortgagees and their agents are stated in the Mortgagee Approval Handbook (MAH) (Directive Number 4060.1 REV-2 dated Aug. 14, 2006) provided by HUD. A mortgagee may be instructed in chapter 7, section 7-3 of MAH, to have quality control plan administered by personnel independent of the loan originators and servicers. The quality control plan may be performed in-house or by an outside firm. Creating a quality control plan and maintaining compliance with governmental regulations pertaining to mortgagees can be difficult due to variety of agencies, regulations, requirements, and laws related to mortgages. Executing the quality control plan and performing compliance monitoring may be performed by a compliance monitor. A compliance monitor may be a person or organization specializing in regulations, requirements, and laws related to mortgages.

To verify compliance with regulations, HUD instructs lenders and brokers to audit a percentage or statistical sample of loans that close and fund to the borrower. The percentage of audits may be percentage (like 10%) of all loans, all loans in a category or type of loans, or all loans by a loan officer. A mortgagee may have many employees (or agents) called loan officers processing loans for the mortgagee. Each loan officer may record, store, and file the loan applications and accompanying documentation locally on their individual computers. The loan application and accompanying documentation may be referred to as a loan file. Accompanying documentation may include a HUD-1 form, a closing form, underwriting approval form and conditions, Federal Housing Administration (FHA) documents, United States Department of Veterans Affairs (VA) documents, property appraisal, an Initial 1003 form, an Initial 92900-A form, a Final 1003 form, a Final 92900-A form, credit report, paystubs or paycheck receipts, employment verification, W-2s, tax returns and filings, deed information, bank statements, 401K and other financial statements, gift letters, other assets and property statements, insurance verification, and disclosure forms. Loan files may be stored electronically using loan origination software (LOS) or in paper form in physical files. LOS may store borrower and loan data and apply the date to loan origination documentation. For example, LOS can be Point software produced by Calyx. Locally electronically stored loan files on each loan officer's computer or paper copies can be difficult to access for subsequent audits and data retrieval, and may be difficult to enforce uniformity among loan files with loan officers within a mortgagee company.

LOS can allow the loan officer to enter loan information and apply the entered data onto the forms used in the loan application. LOS may be provided locally to each computer or LOS may be a networked application provided by a central repository, like a database with loan information. The mortgagee or compliance monitor can host or provide the LOS centrally to each of the mortgagee's loan officers. Hosting LOS from a central repository can allow information to be available to the mortgagee, employees of the mortgagee, and the compliance monitor. Hosing the LOS from a central repository may allow LOS to store loan information locally on the loan officer's computer when a network connection is not available. The locally generated or created information on the loan officer's computer may be uploaded each time a network connection to the central repository is established. The central repository may delete each unused locally stored file, close locally stored file that is already funded, or unused file after a predetermined time from a loan officer's computer. The central repository may automatically download information, such as LOS updates, new regulations, correspondence between loan officers and underwriters, or loan information to the mortgagee or loan officers. The hosting of the LOS on a central repository allows the information to be shared among loan officers, underwriters, with other members of the mortgagee, and the compliance monitor for auditing loan files.

As illustrated in FIG. 1, a central repository 100 may be used to host LOS and other related applications used in a loan application and closing process. A borrower 150 may provide information to a mortgage broker 120 or a lender 130 about the borrower's mortgage. The mortgage broker or lender may provide borrower's loan information into LOS or related application into a central repository by transferring the information from a local computer (at the mortgage broker or lender) to the central repository. The information may be provided in electronic or computerized form and may include borrower information, client correspondence, scanned files, files generated by LOS, accounting information, or similar information. The central repository may host a plurality of mortgage brokers and lenders. The central repository may be a central network, a local area network (LAN), or a wide area network (WAN) utilizing a server storage system. Applications on the central repository may use client-server applications. A compliance monitor 110 may access the borrower's loan information from the central repository. The central repository may sort and store the information for a mortgagee by loan officer, category, or type of loan. The central repository may use a series of virtual private servers for each mortgagee or separate physical servers for each mortgagee. The servers may have data backed up periodically to preserve data from loss and data corruption. The central repository may be indexed to access information by any defined field. The central repository may limit access to authorized personnel to specific information by a password security system and exclude unauthorized persons from accessing borrower and mortgagee data. Each mortgagee, loan officer, compliance monitor, and system administration may be grouped into classes and limited to information by their respective classes or other distinguishing characteristics. A hosting service may be the combination of the central repository with compliance monitoring. The hosting service may force users to change passwords periodically. The hosting service may provide a mechanism to prevent data from being removed by a portable electronic storage device, like a flash drive or thumb drive. The central repository may track changes to information by the date of the change and person making the change. The hosting service may provide mechanisms to detect fraud, such as accessing numerous loan files by a loan officer or excessive changes to data to a loan file. The compliance monitor may be able to verify documentation and track changes and fraudulent entries to a loan officer or specified person. The hosting service may compare a mortgagee's defaults or other market indicators with other mortgagees to determine variations in risk and adverse risk assumption.

The compliance monitor 110 may audit a portion, percentage, or statistical sample of the mortgagee's applied loans and closed loans based on the total loan portfolio for a specified time, the total loans handled by a loan officer, the total loans in a category, or type of loan. The results of the audit may be reported back to the mortgagee (mortgage broker 120 or lender 130) using an application of the central repository or the compliance may report to the mortgagee using a mechanism other than the central repository, like email, usenet newsgroup, social networking, or messaging service. Based on the audit and the regulatory requirements for reporting, a mortgagee may report the audit result to a regulatory authority 140 like HUD or a state agency monitoring real estate or residential mortgage loan compliance. The compliance monitor may provide reporting to the regulatory authority.

The compliance monitor may audit both borrower loan files and mortgagee overall compliance. The audit for borrower loan files and mortgagee overall compliance may utilize a checklist. The items of the borrower loan file audit may include review of the borrower's accompanying documentation discussed earlier, like the HUD-1 form. The borrower loan file audit may be performed at regular intervals, like weekly, monthly, quarterly, or yearly. The compliance monitor may conduct an audit after a specified number of loans are closed for a mortgagee or loan officer, or may trigger an audit based of specified predetermined criteria. The mortgagee overall compliance audit may include (1) an operational review, (2) a periodic pre-closing audit of a loan, (3) a site review, (4) an FHA renewal of lender approval, (5) a review or monitoring of state licensing requirements, (6) a review or monitoring for ineligible participants of the mortgagee, (7) a review or monitoring of staffing requirements, (8) a review or monitoring of federal and state laws, (9) a review or monitoring of advertising, (10) a review or monitoring of business changes, (11) a report on quality control file retention, (12) a review or monitoring of neighborhood watch and early warning system, (13) a notification of updates to regulations, and (14) certificate of compliance. Each item of the mortgagee overall compliance audit may performed at a different periodic interval. An item may be performed once (initially), weekly, monthly, or yearly. For example, an operational review (1) may be performed once initially, a pre-closing audit (2) of a loan may be performed monthly, and a site review (3) may be performed annually.

(1) An operational review may include a questionnaire on mortgagee's existing processes and information technology (IT) to identify weaknesses. The actual processes may be observed, recorded, and documented through electronic means. (2) During a periodic pre-closing audit of a loan, a selected mortgagee's loan file may be audited through the loan process in real time or shortly before closing. The selected pre-closing mortgagee's loan file may be selected randomly. The pre-closing audit can identify early problems of the loan closing process and provide feedback on process changes. (3) A site review may review the business address, the professional and business-like environment of the office, the office arrangement, office partitions for separation and privacy, adequate displays of and access to relevant statutes and regulations, and the sufficiency of personnel training. (4) An FHA renewal of lender approval may require accessing a webpage or website and provide information on functions performed by the mortgagee, insurance endorsement information, branches of the mortgagee, areas approved for doing business, sponsor relations, and authorized agent relations. The hosting service may provide access to Lender Assessment SubSystem (LASS). (5) Monitoring of state licensing requirements can review state requirements of a real estate division license and upcoming expiration dates of loan officer's state licenses and certifications. For example, the monitoring may notify a mortgagee of the loan officers with licenses expiring within 60 days. Monitoring may include renewal of the principal lending manager (PLM) state broker license. (6) Monitoring for ineligible participants of the mortgagee may include identifying an officer, partner, director, principal, agent, or employee on a HUD, FHA, Federal Home Loan Mortgage Corporation (FHLMC or Freddie Mac), Federal National Mortgage Association (FNMA or Fannie Mae), or other governmental agency Limited Denial of Participation (LDP) list. The LDP list may include individuals, companies, and organizations indicted, convicted, or under investigation for engaging in business practices that do not conform to generally accepted practices of prudent mortgagees or other regulatory violations. A mortgagee may be unable to renew and get FHA lender approval or become uninsurable if the mortgagee hires or associates with a person on the LDP list. (7) Monitoring of staffing requirements can include verifying the number of employees working during office hours at a home office and branch office. The monitoring may include verifying loan officers, loan originators, underwriters, and managers that are employees and not independent contractors or contract employees. Employment as an employee may be shown by the use of a W-2. The reviewing and monitoring of staffing requirements may prospectively review future schedules or subsequent payroll and past schedules. (8) Monitoring of federal and state laws may include summarizing and notifying the mortgagee of the regulations, updates, and changes related to providing loans to borrowers such as the Fair Housing Act, Executive Order 11063 on Equal Opportunity in Housing, the Equal Credit Opportunity Act (ECOA), the Real Estate Settlement Procedures Act (RESPA), and the Home Mortgage Disclosure Act (HMDA). (9) Monitoring of advertising may review the advertising literature for false advertising or misuse of federal or state agencies and wrongful use of government seals. (10) Monitoring of business changes can include identifying business information changes that use timely notification to governmental agencies, such as HUD. For example, HUD may require certain changes in information to be reported within 10 day or 30 days. (11) A report on quality control file retention may provide the number or percentage of files that are retained for a regulatory time frame. For example, the regulatory time frame for retaining files may be two years, so a report on quality control file retention may show the number or percentage of files retained and not retained. The central repository may retain file for a predetermined time and automatically delete files after a predetermined time. The report may also include a determination of completeness of files and the number or percentage of files with a requisite completeness. (12) Monitoring of neighborhood watch and early warning system may identify early payment defaults and identify patterns of early defaults by location, program, loan characteristic, loan correspondent or sponsor, appraiser, loan officer, processor, or underwriter. An early payment defaults can occur when a borrower with a closed loan fails to make the contracted payment or series of payments of the loan. For example, the monitoring may use public neighborhood watch website for any loan that is 60 days past due within the first six payments or months. (13) A notification of updates to regulations may include publishing updates and changes to state licensing requirements, ECOA, RESPA, HMDA, Truth in Lending Act (TILA), Federal Credit Reporting Act (FCRA), HUD, and FHA. Updates to regulations may change processes and procedures. (14) A certificate of compliance may be issued on a periodic basis by the compliance monitor to the mortgagee stating the items audited, the status of each item, and the overall status of the audit.

A compliance monitor may check red flag rules. Red flag rules can be inconsistent personal information that can indicate the use of a stolen identity to commit fraud. Red flag rules may include date of birth conflicts for social security number (SSN), multiple name variations for SSN, potential forgery of SSN, address variations on paystubs or W-2 forms, address variations on credit reports, picture of drivers license not representative of borrower, inconsistencies and misspellings on drivers license, potential misrepresentation or forgery of income documentation, variations in applicant signatures, or inability to provide or explain no SSN card, drivers license, or other identification card. The hosting service may provide a conversation log between borrowers and the mortgagee and between employees of the mortgagee.

A borrower loan file audit and a mortgagee overall compliance audit may have a status for each item on a checklist or status for the entire audit. The status may be categorized or ranked based on severity or degree of compliance. The status may be a numerical rank representing the degree of compliance or discrete pass or fail. The status categories or compliance categories may be low risk, acceptable risk, moderate risk, material risk, or other descriptive category. An overall status of an audit may be determined by weighting each item and summing the product of each item's status with the item's weight. An overall status may be determined by assigning status based on regulatory guidelines and failures of specified items. Reporting of audit results to a regulatory agency may be determined by an overall audit status or specific checklist items of an audit. An audit may include a review of closed loan files and rejected loan files.

In another embodiment, the central repository 100 may provide an exchange of information about borrower loan information and mortgagee information to the mortgage broker 120, lender 130 and compliance monitor 120, as illustrated in FIG. 2. Each mortgage broker 120 and lender 130 may employ loan officers 124, loan processors, underwriters, and a principal lending manager (PLM) 122. A PLM may be a manager or a business owner. Loan officers may obtain information from borrowers (not shown). The loan officers (and loan processors and underwriters) may enter and submit borrower loan information and data for their borrowers to the central repository. The central repository may maintain and store the borrower loan information and provide the loan officer with updated and current borrower loan information. The principal lending manager may be able to enter and retrieve borrower loan information and mortgagee information. The compliance monitor may access, retrieve, and audit borrower loan information and mortgagee information. Either the mortgagee or compliance monitor may report the results of the audit to the regulatory authority 140.

A borrowers loan information may include reconciling an application with final documents, checking an appraisal for reasonable comparables and within a specified time, verifying documents signed, checking handling of employment verification for suspect parties, verifying tax returns and self-employment financials, verifying credit reports ordered and filed, determining any judgments against a borrower, determining funding source from an entity other than borrower, verifying discrepancies were resolved and documented, checking that debt ratios are within guidelines, verifying the accuracy and completeness of underwriting conclusions, checking that conditions were cleared prior to closing, determining that forms were accurately completed and appropriate fees charged, verifying that file contains relevant documents, verifying insurance coverage, determining suspect "flipped" property, determining "straw buyer" transaction, and verifying documents evidenced and retained. A "flipped" property may be a property that was owned by a previous owner for a short period of time with the intent to resell. A "flipped" property may have a abnormally high appraisal value. A "straw buyer" transaction is many borrowing transactions with the same buyer who cannot qualify for more than a single property. A "straw buyer" is used by sellers to eliminate their obligations on a debt and property.

A compliance monitor may use a subscription program to charge a mortgagee for hosting LOS and providing audits. A compliance monitor may charge a mortgagee for audits or hosting based on a periodic rate (like monthly), a volume of storage space usage of the central repository, the number of files generated and hosted, the number of loan officers, or a combination thereof. A mortgagee may be charged separately for compliance monitoring, auditing, and hosting of LOS and other compliance software. Each item of audit checklist list may be charged and billed separately. Hosting, compliance monitoring, and auditing may be provided together and charged as a single service.

Centralized hosting provides a benefit of creating paperless files and direct access to data for audits. Hosting allows accurate sampling of files based on requested or regulatory criteria which can reduce the manipulation of files provided by a mortgagee for auditing. The hosting can provide transparency of the data used in audits because the same data is used for loan approval and audits.

Another embodiment provides a method 300 for monitoring mortgagee regulatory compliance using a centralized repository, as shown in the flow chart in FIG. 3. The method includes the operation of hosting 310 loan origination software (LOS) from a centralized repository accessible to a compliance monitor and a mortgagee. The operation of recording 320 borrower loan information into the centralized repository by the mortgagee using the LOS follows. The next operation of the method may retrieving 330 borrower loan information by the compliance monitor using the LOS.

The method 300 further includes auditing 340 borrower loan information by the compliance monitor for regulatory compliance. The operation of reporting 350 audit results to the mortgagee follows.

The method and system for monitoring mortgagee regulatory compliance using a centralized repository may be implemented using a computer readable medium having executable code embodied on the medium. The computer readable program code may be configured to provide the functions described in the method. The computer readable medium may be a RAM, ROM, EPROM, floppy disc, flash drive, optical drive, magnetic hard drive, or other medium for storing electronic data. Additionally, the method and system for monitoring mortgagee regulatory compliance using a centralized repository may be downloaded as a computer program product transferred from a server or remote computer to a requesting or client device by way of machine readable data signals embodied in a carrier wave or other propagation medium.

A mortgagee and compliance monitor may use a mortgagee device and compliance monitor device to perform their respective functions. The mortgagee device and compliance monitor device may be a computer, portable electronic device, telephone, or similar electronic device configured to record to and retrieve from the centralized repository borrower loan information and mortgagee loan information.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein. Accordingly, it is not intended that the invention be limited, except as by the claims set forth below.

The invention claimed is:

1. A method for monitoring mortgagee regulatory compliance using a centralized repository, comprising:

hosting loan origination software (LOS) from a centralized repository utilizing a server storage system accessible to a compliance monitor and a mortgagee;

recording borrower loan information via a mortgagee client-server application into the centralized repository by the mortgagee using the LOS;

retrieving borrower loan information via a compliance monitor client-server application by the compliance monitor using the LOS;

auditing borrower loan information by the compliance monitor for regulatory compliance; and reporting audit results to the mortgagee, wherein audit results are configured to include compliance violations which are graded into one of a low risk compliance violation, an acceptable risk compliance violation, a moderate risk compliance violation, and a material risk compliance violation categories, wherein information about acceptable risk compliance violations, moderate risk compliance violations, and material risk compliance violations are reported to the mortgagee.

2. The method as in claim 1, wherein the mortgagee is selected from the group of a mortgage broker, a loan originator, a loan producer, a loan servicer, and a lender.

3. The method as in claim 1, wherein the material risk compliance violations are reported to a regulatory authority.

4. The method as in claim 1, wherein auditing mortgagee information including borrower loan information includes completing a checklist to verify regulatory compliance.

5. The method as in claim 1, wherein auditing borrower loan information occurs within a predetermined time after a loan closing and occurs at a frequency for the mortgagee based on a predetermined number of mortgages closed.

6. The method as in claim 1, wherein auditing borrower loan information is configured to be audited based on a predetermined percentage of loans closed by a mortgagee or loan officer or predetermined statistical sample of loans closed by a mortgagee or loan officer.

7. The method as in claim 1, wherein auditing borrower loan information is selected from the group of:
  reconciling an application with final documents,
  checking an appraisal for reasonable comparables and within a specified time,
  verifying documents signed,
  checking handling of employment verification for suspect parties,
  verifying tax returns and self-employment financials,
  verifying credit reports ordered and filed,
  determining any judgments against a borrower,
  determining funding source from an entity other than borrower,
  verifying discrepancies were resolved and documented,
  checking that debt ratios are within guidelines,
  verifying the accuracy and completeness of underwriting conclusions,
  checking that conditions were cleared prior to closing,
  determining that forms were accurately completed and appropriate fees charged,
  verifying that file contains relevant documents,
  verifying insurance coverage,
  determining suspect "flipped" property,
  determining "straw buyer" transaction, and
  verifying documents evidenced and retained.

8. The method as in claim 1, further comprising assessing the mortgagee a fee based on a loan audited and the mortgagee information reviewed.

9. The method as in claim 1, wherein the borrower loan information recorded in the central repository is configured to be periodically stored as back-up data.

10. The method as in claim 1, wherein the LOS is configured to be accessible to a loan officer employed by the mortgagee.

11. The method as in claim 10, wherein borrower loan information for a limited number of borrowers are stored locally on a loan officer's computer when recording borrower loan information into the centralized repository using the LOS, and borrower loan information exceeding the limited number of borrowers are removed from the loan officer's computer.

12. The method as in claim 10, wherein borrower loan information is stored locally on a loan officer's computer when recording borrower loan information into the centralized repository using the LOS, but borrower loan information is removed from the loan officer's computer when the loan closes.

13. The method as in claim 1, further comprising:
  submitting mortgagee information into the centralized repository accessible to the compliance monitor and the mortgagee after hosting LOS, wherein the mortgagee information includes an effective date;
  reviewing mortgagee information by the compliance monitor for regulatory compliance.

14. The method as in claim 13, wherein reviewing mortgagee information is triggered by an expiration of the effective date associated with the mortgagee information.

15. The method as in claim 13, wherein mortgagee information is selected from the group of information on the mortgagee's loan officer licenses, mortgagee site location and contact information, mortgagee office staffing, mortgagee site review, and mortgagee regulatory approval and licenses.

16. The method as in claim 13, further comprising reporting updates to regulations on a periodic basis to the mortgagee distributed through the central repository and updating mortgagee information when the effective dates associated with mortgagee information expire or reporting non-updated mortgagee information to the mortgagee.

17. The method as in claim 16, further comprising updating mortgagee information through a human entry of the mortgagee information or an automated electronic entry process of the mortgagee information.

18. A method for monitoring mortgagee regulatory compliance using a centralized repository, comprising:
  hosting loan origination software (LOS) from a centralized repository using a server accessible to a compliance monitor and a mortgagee;
  submitting mortgagee information into the centralized repository accessible to the compliance monitor and the mortgagee, wherein the mortgagee information includes an effective date;
  reviewing mortgagee information by the compliance monitor for regulatory compliance;
  recording borrower loan information into the centralized repository by the mortgagee using the LOS;
  retrieving borrower loan information by the compliance monitor using the LOS;
  auditing borrower loan information by the compliance monitor for regulatory compliance, wherein auditing borrower loan information includes completing a checklist to verify regulatory compliance; and
  reporting audit results to the mortgagee, wherein audit results are configured to include compliance violations which are graded into one of a low risk compliance violation, an acceptable risk compliance violation, a moderate risk compliance violation, and a material risk compliance violation categories, wherein information about acceptable risk compliance violations, moderate risk compliance violations, and material risk compliance violations are reported to the mortgagee.

19. A system for monitoring mortgagee regulatory compliance using a centralized repository, comprising:
   a centralized repository for hosting loan origination software (LOS);
   a mortgagee device for recording borrower loan information using the LOS into the centralized repository; and
   a compliance monitor device for retrieving borrower loan information using the LOS, auditing borrower loan information for regulatory compliance, and reporting audit results to the mortgagee device,
   wherein audit results are configured to include compliance violations which are graded into one of a low risk compliance violation, an acceptable risk compliance violation, a moderate risk compliance violation, and a material risk compliance violation categories, wherein information about acceptable risk compliance violations, moderate risk compliance violations, and material risk compliance violations are reported to the mortgagee device.

20. The method as in claim 18, wherein reviewing mortgagee information is triggered by an expiration of the effective date associated with the mortgagee information.

\* \* \* \* \*